Figure 1:
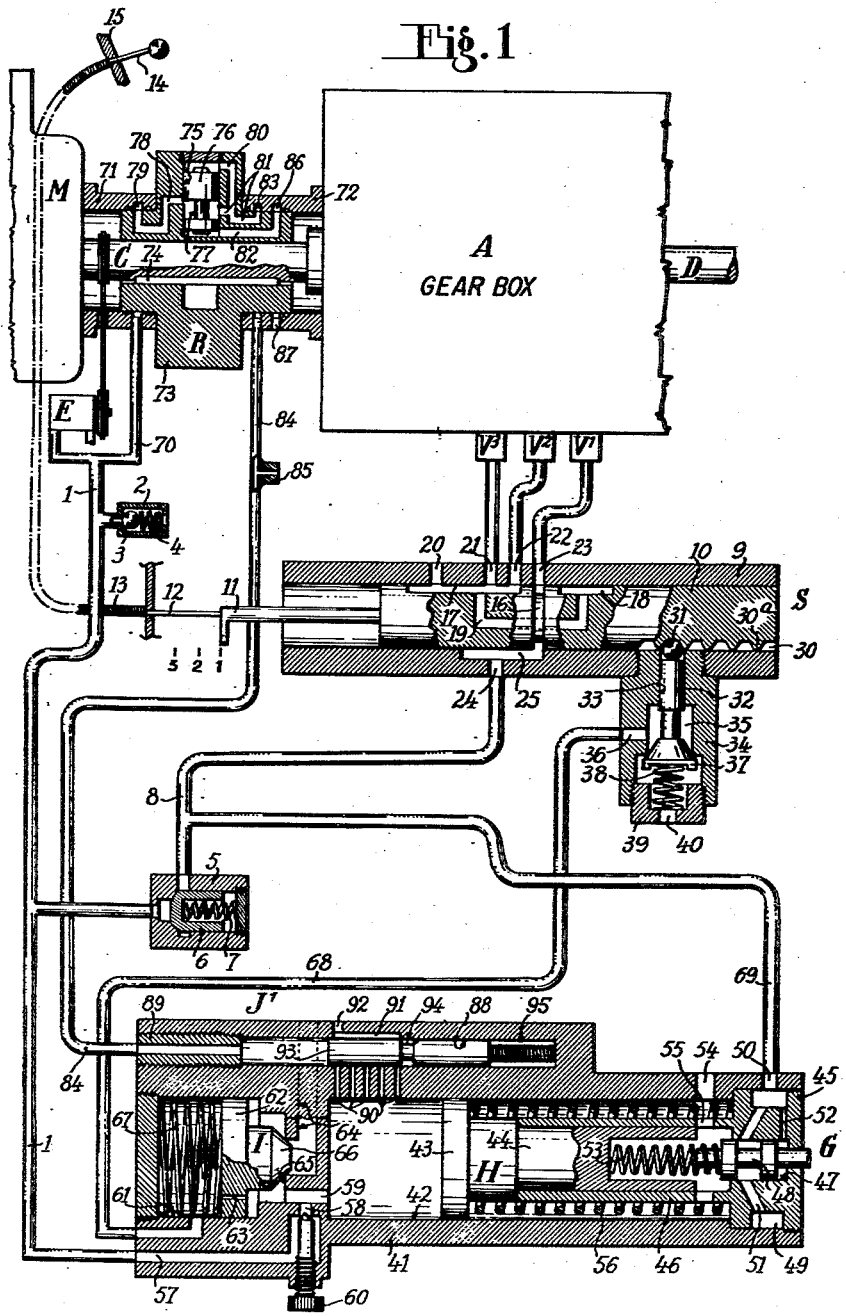

Dec. 10, 1957

H. BARBIER 2,815,673

CONTROL DEVICE FOR A MOTOR VEHICLE TRANSMISSION MECHANISM

Filed June 19, 1956

2 Sheets-Sheet 1

Inventor
Henri BARBIER
by J. Delatre Seguy
Attorney

United States Patent Office 2,815,673
Patented Dec. 10, 1957

2,815,673

CONTROL DEVICE FOR A MOTOR VEHICLE TRANSMISSION MECHANISM

Henri Barbier, Nancy, France, assignor to Compagnie de Pont-a-Mousson, Nancy, France, a French body corporate Application June 19, 1956, Serial No. 592,396

Claims priority, application France June 20, 1955

6 Claims. (Cl. 74—336.5)

The present invention relates to power transmitting mechanisms for motor vehicles of the type comprising, disposed between a driving shaft and a driven shaft, a gear box of which the toothed elements are always in mesh and which is controlled by hydraulic actuating devices, such as fluid motors and/or clutches actuated by a liquid under pressure, such as oil.

An object of the invention is to provide a control device for such a transmission mechanism, this device being of the type already described in the French Patent No. 1,090,563 filed by the applicant and which comprises in combination: a source of liquid under pressure and, connected in parallel to the pipe connected to the outlet of this source, on one hand a selector for admitting the liquid in succession into the various hydraulic actuating devices of the gear box and, on the other hand, a control device controlling the pressure admitted into the selector by means of a regulated discharge or exhaust of said pipe under the action of a movable member of this control device; and a hydraulic control device comprising a variable capacity chamber and adapted to control the movable member of the control device in accordance with the pressure prevailing in the variable capacity chamber in such manner that a displacement of the movable member in a direction for stopping said exhaust corresponds to an increase in said pressure prevailing in the chamber.

According to the invention, a centrifugal governor driven by the driving shaft, also fed, through a by-pass, by said source of liquid under pressure and furnishing an outlet pressure which varies with the speed of the driving shaft and increases therewith, is combined with the hydraulic control device in such manner that the pressure in the variable capacity chamber increases in accordance with said outlet pressure of the governor.

Thus the closure of the exhaust and therefore the increase in pressure in the selector and the actuating devices is controlled by the governor and, in consequence, by the speed of the driving shaft.

Under these conditions, and notably when the vehicle starts to move off, the pressure rise in the hydraulic actuating devices is controlled or governed by the power of the motor, which permits eliminating the usual clutch between the driving shaft and the gear box and avoids any stalling of the motor.

According to one embodiment, the variable capacity chamber is connected, for filling it in the known manner, to the pipe connected to the outlet of the source of liquid under pressure through an aperture of variable size and its pressure increase is controlled by an auxiliary exhaust device controlled by the liquid pressure provided by the governor.

Thus all the speed changes are delayed in respect of their engagement, this delay being under the control of the governor when the vehicle starts to move off.

According to another embodiment, the variable capacity chamber is directly connected to the outlet of the governor so that the engagement of the speeds is only delayed when the vehicle is moving off.

Another object of the invention is to provide a transmission unit between the driving shaft and a driven shaft, this unit comprising, in combination with a transmission mechanism having a gear box of which the toothed elements are always in mesh and which is actuated by fluid motors and/or hydraulic clutches, a control device of the above-mentioned type but improved in the manner disclosed hereinunder.

Further features and advantages of the invention will be apparent from the ensuing description with reference to the accompanying drawings, to which the invention is in no way limited.

Figure 2:
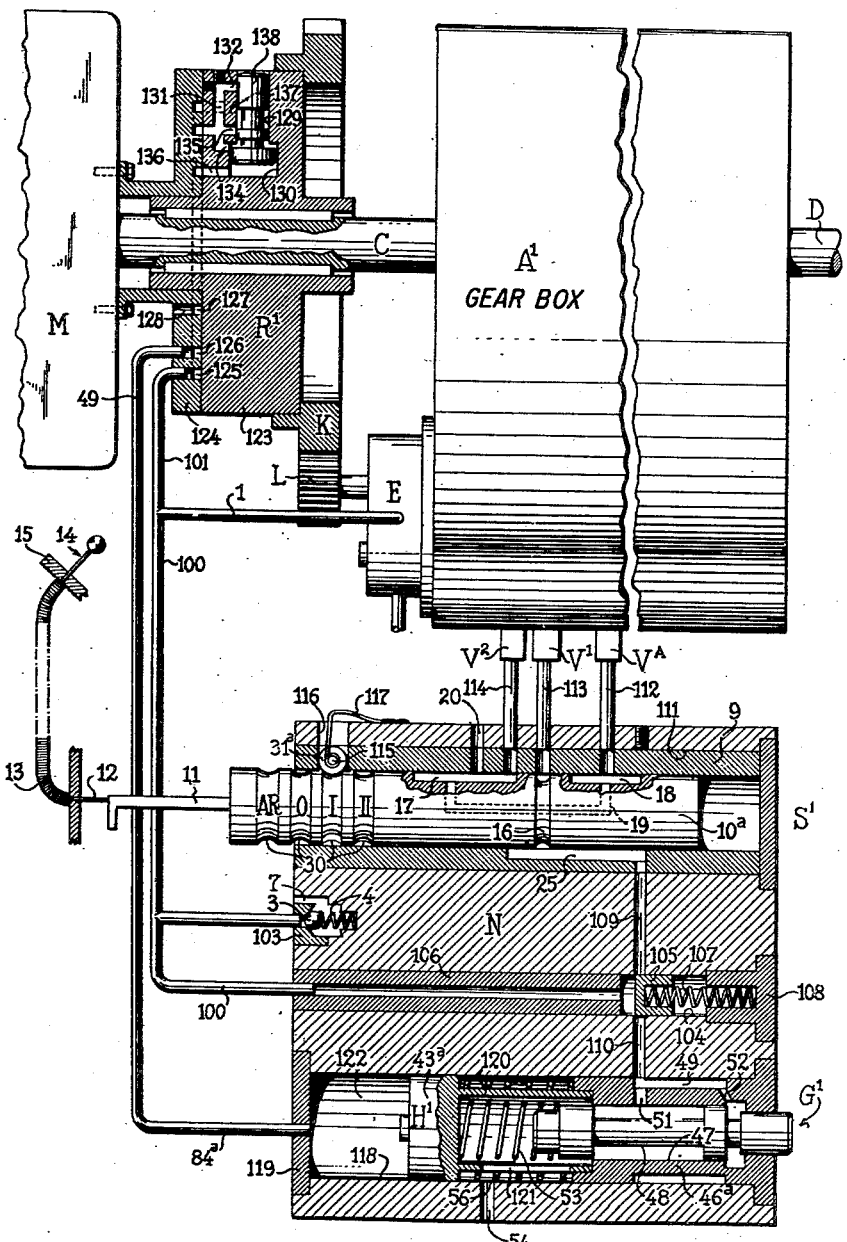

In the drawings:

Fig. 1 is a diagrammatic assembly view of a transmission unit embodying the invention, the arrangement of its parts corresponding to engagement of the first speed of the gear box, and Fig. 2 is a similar view of a modification of the invention.

In the embodiment shown in Fig. 1, the invention is applied to the control of a gear box A disposed between a driving shaft C, driven by a motor M, and a driven shaft D.

This gear box A is of the known type in which the toothed elements are always in mesh. It permits, for example, three speed changes, each speed being engaged by admitting oil under pressure into one of three fluid motors $V_1$, $V_2$, $V_3$ which actuate the engaging mechanisms for each of the speeds.

This oil under pressure is supplied by a pump E driven by the driving shaft C. This pump pumps oil under pressure through a pipe 1 to which is branch-connected a relief valve 2 which has a ball 3 and a spring 4 and which opens to the exhaust and is set to allow a maximum pressure $Pm$, which is, for example, of the order of 18 kg. per sq. cm. A second or check valve 5 is also branch-connected to pipe 1 and has a valve member 6 which is urged against its seat by a spring 7, this valve allowing when open the oil under pressure from the pipe 1 to flow into a pipe 8 which is connected to a selector S.

This selector S is of the type having a slide valve and comprises a body 9 in which is longitudinally slidable a slide 10 which is capable of occupying several positions in the longitudinal direction and is manually shifted by means of a rod 11. This rod is preferably connected, by a cable 12 enclosed in a sheath 13, to a push-pull rod 14 disposed on the dashboard 15 or in the vicinity of the driving wheel if the control device is incorporated in a road motor vehicle.

The slide 10 comprises an annular recess 16 disposed between two longitudinal recesses 17 and 18 which are interconnected by a passageway 19. These recesses are adapted to cooperate respectively with four apertures 20, 21, 22, 23, and with a further aperture 24 which is connected to a longitudinal recess 25 formed in the body 9. Thus in each of the longitudinal positions of the slide 10, the recess 16 is, first, in communication with the longitudinal recess 25 and, secondly, in communication successively with one of the apertures 21, 22 and 23, the other two apertures being put into communication with the aperture 20 by the recess 17 and/or the recess 18.

Each position of the selector S corresponds to one speed of the gear box.

The aperture 20 communicates with the housing of the mechanism and constitutes an exhaust aperture. The other apertures 21, 22 and 23 are connected respectively to the fluid motors $V_3$, $V_2$ and $V_1$ which correspond to the third, second and first speeds of the gear box A. The aperture 24 is connected to the pipe 8.

The slide 10 is provided at one of its ends with a recess 30 comprising a series of teeth 30ᵃ which form recesses the number of which corresponds to the number of possible positions of the slide. This recess 30 co-operates with a ball 31 supported by a piston 32 which is movable in a bore 33, the axis of which is orthogonal to the axis of the slide 10. This bore is formed in a member 34 attached to the body 9 in such position that, for each position of the slide 10, the bore 31 is situated between two teeth 30ᵃ.

The lower end of the bore 33 is enlarged so as to form a chamber 35 communicating with an aperture 36. The lower end of the piston 32 is conical so as to form a valve 37 capable of closing the bottom aperture or open end of the chamber 35. A compression spring 38 is disposed between the valve 37 and a plug 39 provided with an aperture 40 and screw-threadedly engaged in the member 34. This spring ordinarily applies the valve 37 against the valve seat.

The pipe 1 is connected, on one hand, to a retarding device H controlled by an auxiliary exhaust device I which is, in turn, controlled by the valve 37 and, on the other, to a main exhaust device G.

The retarding device H comprises a body 41 in the mid-part of which is formed a bore or aperture 42 in which is movable a piston 43 provided with a cylindrical extension 44. This piston defines between its end and the end of the bore 42 a variable capacity chamber.

Disposed at the right end of the body 41 as seen in Fig. 1, is a plug 45 comprising a tubular extension or skirt 46 in which is slidable the extension 44 of the piston 43.

The main exhaust device G is provided in the plug 45. The plug 45 comprises a bore 47 in which is slidable a slide valve 48 including two flanges or shoulders separated by an intermediate recess.

Provided in the head of the plug 45 is, furthermore, an annular recess 49 which communicates, firstly, with an aperture 50 formed in the end of the body 41 and connected by a pipe 69 to the pipe 8, and, secondly, with a series of apertures 51 which are formed in the plug in line with the recess of the slide 48 and communicate with the bore 47. A passageway 52 connects the recess 49 to the right end of the bore 47, as seen in Fig. 1, behind the slide 48. The latter is subjected to the action of a spring 53 supported against the extension 44 of the piston 43 and is urged thereby toward the right. The slide 48 is adapted to connect the recess 49, the pipe 69, and hence the supply circuit of the fluid motors, with an exhaust aperture 54 formed in the body 43, by way of the apertures 55 provided in the tubular extension 46 of the plug 45. A spring 56, bearing against the latter, tends to urge the piston 43 toward the left, as seen in Fig. 1.

The retarding device H comprises the variable capacity chamber (42—43) with its return spring 56. This chamber communicates with the pipe 1 above the valve 5, relative to the flow of the oil under pressure, by way of a pipe 57, an aperture 58 and a passageway 59. The size of the aperture 58 is adjustable by a needle valve 60 which constitutes the adjusting member of the retarding device.

The auxiliary exhaust device I, which is adapted to connect the chamber (42—43) to exhaust, comprises a bore 61 formed in the left part of the body 41, as seen in Fig. 1. This bore is divided into a right chamber and a left chamber by a piston 62 provided with a calibrated orifice 63 through which these two chambers intercommunicate.

The right chamber freely communicates with the chamber (42—43) by way of the passageway 59, and it is connectible to exhaust by way of an exhaust passageway 64, part of which is shown in dotted line in Fig. 1. The entrance of this passageway forms a seat 65 for an exhaust valve 66 unitary with the piston 62. Housed in the left chamber is a spring 67 which tends to apply the valve 66 on its seat. This chamber is connected by a pipe 68 to the aperture 36 of the exhaust valve 37 carried by the selector S.

The structure just described is identical to that disclosed in the above-mentioned French Patent No. 1,090,563. It is completed according to the present invention in the following manner:

Connected to the pipe 1 is a pipe 70 connected to a governor R mounted on the driving shaft C between two fixed rings 71 and 72. The governor R comprises a body 73 keyed at 74 to the shaft C. This body is provided with a radial bore 75 in which is slidable a slide or plunger 76 having an annular recess 77. Communicating with the bore 75 is an oil supply passageway 78 which is connected to the pipe 70 by way of an annular recess 79 formed in the ring 71. The passageway 78 is capable of being completely or partially closed by the slide 76 depending on the speed of the shaft C.

Communicating with the end of the bore 75 remote from the axis of the shaft C is a passageway 80 leading to an oil outlet passageway 81 connected to the oil inlet passageway 78 through the recess 77 in the slide 76. An oil exhaust passageway 82 is connected to the other end of the bore 75. Through the medium of an annular recess 83 formed in the ring 72 the passageway 81 is connected to a pipe 84 in which is disposed an escape jet 85 and which is connected to a device J¹ controlling the capacity of the variable-capacity chamber of the retarding device H. The oil exhaust passageway 82 is connected, through an annular recess in the ring 72, to an exhaust aperture 87.

Owing to the fact that the outlet end of the passageway 78 in the bore 75 is closed to a variable extent by the slide 76, the pressure in the oil outlet passageway 81 is capable of varying for example, between 0.3 kg. per sq. cm. and 5 kg. per sq. cm. for speeds of the shaft C between 600 and 3000 R. P. M.

The control device J¹, controlling the volume of the chamber of the retarding device H, comprises a bore 88 which is, in the embodiment shown in Fig. 1, formed in the wall of the bore 42. The bore 88 is closed by a plug 89 through which extends the pipe 84 through which arrives the oil from the governor R.

The bore 88 is connected, by a series of apertures 90 evenly spaced apart, to the bore 42 of the device H. Formed in the wall of the bore 88 opposite the apertures 90 is a longitudinal recess 91 which communicates with an exhaust aperture 92 and has a length equal to the distance between the first and last aperture 90.

Slidable in the bore 88 is a slide 93 capable of closing all the apertures 90 and provided with an annular recess 94 adapted to connect, depending on its longitudinal position, one of the apertures 90 to the exhaust aperture 92. The width or axial extent of the recess 94 is equal to that of the space between two apertures 90.

The slide 93 may be moved, in opposition to the action of a spring 95 bearing against the closed end of the bore 88, by means of the pressure prevailing in the pipe 84.

The device operates in the following manner:

Let it be supposed that the motor vehicle is stationary, the selector S is in its position corresponding to engagement of the first speed of the gear box, and the motor is idling at, for example, a speed of 600 R. P. M. If the motor is gradually accelerated so that the vehicle starts to move off, the speed of the shaft C increases and the governor R delivers oil under increasing pressure through the pipe 84 to the device J¹.

For a pressure less than or equal to 0.3 kg. per sq. cm., the slide 93 is held in its extreme left position, as seen in Fig. 1, by the spring 95 and the first aperture 90 is connected to the exhaust aperture 92 by way of the recess 94. Thus the variable capacity chamber 42—43, the filling of which commences, is connected to exhaust as soon as the piston 43 uncovers the first aperture 90. The volume of the chamber 42—43, and in consequence the pressure exerted by the spring 53 and the pressure of the oil fed to the fluid motor of the first speed of the gear box A, are restricted to a value depending on the situation of the first aperture 90 in the bore 42.

When the speed of the shaft C increases, the slide 76 of the governor R is urged away from the axis of the shaft C by centrifugal force and uncovers a little more of the end of the oil supply passageway 78 and the pressure prevailing in the pipe 84 increases. The slide 93 of the device J¹ is therefore displaced toward the right, as seen in Fig. 1, compresses the spring 95 and closes the first aperture 90. Thus the chamber 42—43 is filled still more and the spring 53 is further compressed until the second aperture 90 is uncovered by the piston 43 and in turn connected to the exhaust aperture 92 by way of the recess 94. The pressure in the fluid motor V¹ is therefore once more restricted to the value corresponding to the compression of the spring 53 which depends on the position of the piston 43 which is itself dependent on the position of the second aperture 90.

Each of these apertures 90 is connected in succession to the exhaust aperture 92 whereas the preceding apertures are closed, which permits increasing little by little the volume of the chamber 42—43 and in consequence the pressure of the oil in the fluid motor V¹.

In the course of this increase of pressure, the vehicle gains speed gradually, the speed increasing with acceleration of the motor and in consequence with the rate of pressure rise in the fluid motor V¹.

When the speed of the motor M exceeds 1200 R. P. M., the oil pressure in the pipe 84 is such that the spring 95 is completely compressed and all the apertures 90 are closed, which permits the chamber 42 to be filled until maximum pressure prevails therein, corresponding, for example, to a pressure of 15 kg. per sq. cm. in the fluid motor V¹. The latter is then fully operative and the first speed is fully engaged. The moment when the fluid motor V¹ becomes fully operative corresponds to the end of conventional clutch operation.

As is known, the chamber 42 is filled through the passageway 59 at a rate satisfying a law which is independent of time. Furthermore, according to the present invention, the filling of the chamber 42 is always limited, in the course of starting, by the position of the slide 93, this position depending on the rotational speed of the motor.

In other words, for a given motor speed between idling speed and the speed at which the fluid motor V¹ is fully operative, the pressure in the fluid motor V¹ of the gear box A is automatically limited to a given value so that no stalling of the motor can occur. Thus the device permits the vehicle to be started up as progressively as desired without any risk of stalling the motor.

As the vehicle moves and in the course of the subsequent speed changes, the running speed of the motor is distinctly higher than the speed corresponding to engagement of the first speed of the gear box; the slide 93 therefore remains in the extreme right position shown in Fig. 1 and the device J¹ is inoperative.

For changing to the other speeds the operation of the device is similar to that described in the aforesaid French Patent No. 1,090,563.

For example, when changing to second speed by operating the push-pull knob 14, the slide 21 of the selector S is displaced. The ball 31 is depressed owing to the passage of a tooth 30ª and this causes the valve 37 to open. This opening connects the pipe 68 and the right chamber between the piston 62 and the bore 61 to the exhaust aperture 40. Under the effect of the pressure prevailing in the chamber 42 on the left side of the piston 43, the valve 66 is lifted off its seat and this chamber 42 is connected to exhaust through the passageway 64.

Thus under the effect of the spring 56, the piston 43 is rapidly moved toward the left, as seen in Fig. 1, and reduces the pressure exerted on the spring 53 of the slide 48 until minimum pressure is exerted thereon and the pressure in the selector S drops.

The pressure in the selector S, and in consequence in the fluid motors V¹, V², V³ is balanced by the action of the spring 53 on the slide 48, and the value of minimum compression of the spring 53 is so selected that the residual pressure prevailing in the selector S and in the fluid motors when the variable capacity chamber is connected to exhaust, corresponds to the pressure for initiating operation of the fluid motors.

As soon as the following speed of the gear box is engaged, the ball 31 falls into the recess between teeth 30ª and the valve 37 is returned to its seat by the spring 38 and the exhaust valve 66 returned to its seat by the spring 67.

As soon as the valve 66 returns to its seat 65, the oil, in permanent supply through the aperture 58 the size of which is adjustable by the needle valve 60, fills the variable capacity chamber on the left side of the piston 43 at a speed substantially independent of the rate of delivery of oil from the pump E, that is the speed of the shaft C.

As the variable capacity chamber is filled, the piston 43 is moved to the right, as seen in Fig. 1, and this causes a progressive compression of the spring 53 controlling the pressure in the fluid motors.

To summarize, each time a speed of the gear box is changed, the supply circuit for the fluid motors is first suddenly connected to exhaust and thereafter progressively put under pressure at a speed selected as desired by setting the needle valve 60. The resultant retarding or delaying action permits the speeds of the gear box to be changed smoothly.

Further, if for some reason the vehicle is braked so that it reaches such speed that, for the particular speed of the gear box which is engaged, the corresponding speed of the shaft C descends below 1200 R. P. M., the slide of the governor moves progressively toward the axis of the shaft C under the effect of the pressure acting on its end face remote from said axis. The aperture 78 is progressively closed and the pressure in the pipe 84 decreases. The piston 93, subjected to the preponderant pressure of the spring 95, moves toward the left and connects the apertures 90 in succession to the exhaust resulting in a partial emptying of the chamber 42 and a drop in the pressure in the fluid motor V¹, V² or V³ in operation. In the extreme case, for a very low speed of the vehicle which would normally be liable to cause stalling of the motor, the corresponding fluid motor is empty and the transmission is disengaged; this corresponds to freewheeling which ceases as soon as the motor is accelerated for regaining speed.

Fig. 2 shows a simplified arrangement whereby the actuating devices or fluid motors V¹—Vᴬ are engaged or rendered operative only when starting by changing from neutral to first speed or to reverse speed.

In this embodiment, the invention is also applied to the control of a gear box A¹ disposed between a driving shaft C, driven by a motor M, and a driven shaft D. Keyed to the shaft C is a centrifugal governor R¹ the body of which is secured to a toothed wheel K.

The gear box A¹ is of the type in which the toothed elements are always in mesh and it permits obtaining, for example, two forward speeds and a reverse speed, each of which is engaged by admitting oil under pressure into one of three fluid motors or rams V¹, V² and Vᴬ actuating the speed-engaging mechanism of each of the speeds.

The oil under pressure is furnished by a pump E fixed, for example, on the casing of the gear box and driven by the toothed wheel K through the medium of a gear pinion L. The pump E discharges into a pipe 1 which is divided into two pipes 100 and 101 connected respectively to a block N housing control means for the gear box $A^1$ and to the governor $R^1$.

Branch-connected to the pipe 100 and disposed in the block N, is a pressure relief valve which has a ball 3, urged against the valve seat by a spring 4, and opens to the exhaust through a slit 7 in the body 103 of the valve, the latter being so arranged that the maximum pressure $Pm$ it permits in the pipe 100 is, for example, of the order of 18 kg. per sq. cm.

The pipe 100 communicates with a bore 104 in the block N. Slidable in this bore is a check-valve 105 which is urged against its valve seat, for example constituted by the end face of a tube 106 fitted inside the bore 104, by a spring 107 which is compressed between the valve 105 and a plug 108 closing the end of the bore 104. The valve 105 is capable of allowing the oil through to a pipe 109 which is connected to the selector $S^1$ disposed in the block N and, furthermore, to a pipe 110 which is connected to the device $G^1$ which is disposed in the block N and has a retarding or damping action when starting.

The selector $S^1$ is of the type having a slide and comprises, like the selector S of the first embodiment, a tubular body 9 disposed in a bore 111 of the block N. The body 9 is provided with a longitudinal recess 25 with which communicates the oil supply pipe 109. Communicating with the interior of the body 9 are three pipes 112, 113, 114 and an oil exhaust aperture 20, the three pipes supplying oil to the fluid motors $V^A$, $V^1$, $V^2$. Longitudinally slidable in the body 9 is a slide $10^a$ which is capable of occupying four positions corresponding to reverse speed, neutral, first speed and second speed. It is manually movable, as in the first embodiment, by means of the push-pull knob 14. The slide $10^a$ comprises the same distributing arrangement as that described for the selector S of the first embodiment.

At one end, the slide $10^a$ is provided with four annular recesses 30 equally spaced apart and corresponding to the four gear box positions of the slide, namely reverse speed (AR), neutral (0), first speed (I) and second speed (II). These recesses co-operate with a locking ball $31^a$ which is provided with a pin 115 and mounted in an aperture 116 in the block N and held against the slide $10^a$ by a blade spring 117 one of the ends of which encompasses the pin 115 whereas the other end is fixed to the block. When the ball $31^a$ is disposed in a recess 30 other than the recess corresponding to neutral, a speed of the gear box is engaged.

It should be noted that the pipes 112, 113, 114 and the aperture 20 are so positioned that whenever the slide $10^a$ is moved for changing speed, the fluid motor previously operative starts to empty itself whereas the next fluid motor starts to be filled. Thus the gear speeds are changed smoothly.

The control device $G^1$ regulating the pressure of the oil admitted into the selector $S^1$, is disposed with the hydraulic control device $H^1$ in a bore 118 in the block N, this bore being closed at one end by a plug 119. A tube $46^a$ is mounted in one part of the bore and is provided with an axially extending annular recess 49 to which the pipe 110 is connected. This recess 49 communicates at both ends with the interior of the tube $46^a$ by way of two apertures 51 and 52.

Slidable in the bore 118 is the piston $43^a$ of the control device $H^1$. This piston is provided with a tubular extension or skirt 120. A spring 56 encompassing this extension bears against the end face of the tube $46^a$ and against the piston $43^a$. The extension 120 is provided with an aperture 121 which is capable of connecting the interior of the extension to an exhaust aperture 54 formed in the block N.

Slidable in the bore 47 of the tube $46^a$ is a slide 48 whose diameter is less than that of the bore of the tubular extension 120. This slide is provided with two flanges separated by an annular recess. A spring 53 disposed inside the tubular extension 120 bears against the piston $43^a$ and the slide 48.

The apertures 51 and 52 communicate with the bore of the tube $46^a$ on either side of the flange at the right end of the slide 48 as seen in Fig. 2. The left flange of the slide 48, applied against the spring 53, is capable of opening the end of the bore 47 when the slide 48 is moved toward the left in a direction to compress the spring 53. At this moment, the recess of the slide 48, and in consequence the pipe 110, are connected to the exhaust aperture 54 by way of the aperture 121.

The part of the bore 118 between the piston $43^a$ and the plug 119 constitutes a variable capacity chamber 122, connected to the governor $R^1$ by a pipe $84^a$ extending through the plug 119.

The governor $R^1$ comprises a body 123 keyed to the shaft C and is in fluid-tight contact with a fixed co-axial ring 124 mounted, for example, on the case of the motor M. Formed in the face of the ring in contact with the governor $R^1$, are three annular recesses 125, 126 and 127 which are concentric with respect to the axis of the shaft C. The recess 125 is connected to the pipe 101, the recess 126 to the pipe $84^a$, and the recess 127 to an exhaust aperture 128 in the ring 124. The body 123 is provided with a radial bore 129 whose end remote from the axis of the shaft C is open, the other end of this bore being enlarged into a chamber 130 co-axial therewith. The body 123 is also provided with a passageway 131 which is connected to the recess 126, constituting an oil outlet to the device $G^1$, and connected at 132 to the outer end of the bore 129, at 134 to the chamber 130, and at 135 to the inner end of the bore 129 relative to the shaft C. The three apertures 132, 135 and 134 are disposed on the same generatrix of the bore 129. Also disposed on this generatrix and communicating with the inner end of the chamber 130 relative to the shaft C, is an aperture 136 connected to the recess 127. Disposed on another generatrix of the bore 129 between the planes containing the apertures 132 and 135, is a passageway 137 communicating with the bore 129 and with the oil inlet recess 125.

Slidable in the bore 129 and the chamber 130 is a mass or slide 138 provided with an enlarged flange, whose diameter corresponds to that of the chamber 130, and two smaller flanges whose diameters correspond to that of the bore 129, these flanges being separated by annular recesses. When the slide 138 is in innermost position relative to the axis of rotation of the governor, that is the axis of the shaft, the aperture 132 communicates with the outer end of the bore 129 and is therefore connected to exhaust together with the apertures 134 and 135, whereas the aperture 137 is closed by one of the small flanges of the slide. Thus the chamber 122 of the device $G^1$ is connected to exhaust and no longer receives oil. When the slide 138 is positioned as shown in Fig. 2, the aperture 134 communicates with the outer face or shoulder of the large flange, the aperture 132 is closed and the apertures 135 and 137 are connected to each other and to the aperture 134 by way of one of the recesses of the slide. Thus oil under pressure is capable of entering the chamber 122 of the device $V^1$ and capable of opposing the centrifugal force exerted on the slide 138 by exerting a centripetal force on the outer face of the large flange of the slide.

The device operates in the following manner:

Let it be supposed that the vehicle is stationary, the selector $S^1$ is in the illustrated position corresponding to first speed (I) and the motor M is idling, for example at a speed of 600 R. P. M. This motor is gradually accelerated when starting, the speed of the shaft C increases, the slide 138 partially opens the apertures 135 and 137, and the governor $R^1$ admits the oil into the pipe $84^a$ leading to the device $V^1$.

For a low rotational speed of the motor corresponding to an oil pressure less than 0.3 kg. per sq. cm., the piston 43ª is held in its extreme left position by the spring 56. Thus the chamber 122 has zero volume and the spring 53 is fully extended. The oil pressure prevailing in the selector S¹, and in consequence in the fluid motor V¹, is equal to that of the spring 56. If the oil pressure increases, it acts on the right end face of the slide 48 through the aperture 52 and urges the slide toward the left, which connects the exhaust aperture 54 to the pipe 110 by way of the aperture 121, until, the pressure having decreased in the pipes 109, 110 and the selector S¹, the pressure exerted by the spring 53 once more becomes preponderant and urges the slide 48 toward the right. Thus this slide permits regulating the pressure in the fluid motors in accordance with the compression of the spring 53, that is the position of the piston 43ª in the bore 118. It should be noted that minimum compression of the spring 53, corresponding to zero volume of the chamber 122, is so selected that it maintains in the oil supply circuit of the selector S¹ a predetermined pressure corresponding to the initial operating or approach pressure of the fluid motor V¹.

When the speed of the shaft C increases, the slide 138 under the effect of centrifugal force opens the oil supply aperture 137 still more and the pressure in the pipe 84ª increases. The piston 42ª of the device G¹ is therefore displaced toward the right and the chamber 122 is progressively filled with ensuing compression of the spring 53 and increased pressure in the fluid motor V¹.

When the speed of the motor M exceeds, for example, 1200 R. P. M., the oil pressure in the pipe 84ª is such that the spring 56 is fully compressed and the chamber 122 is filled under maximum pressure corresponding, for example, to pressure of 15 kg. per sq. cm. in the fluid motor V¹. The latter is then fully operative and the first speed is finally engaged and the vehicle moves off.

It will be seen that, owing to the device G¹, however the driver of the vehicle depresses the accelerator of the motor when starting, the vehicle starts to move smoothly and progressively gains speed. The device G¹ fulfills the function of a damping device when starting, as in the first embodiment.

When subsequently passing from first to second speed by shifting the selector S¹, the fluid motor V² is rendered operative and the fluid motor V¹ inoperative by connecting it to exhaust, the pipe 84ª remains under pressure and the chamber 122 remains filled and plays no more part. This chamber only empties when the vehicle stops and when the motor is slowed down.

At this moment, the speed of the shaft C rapidly decreases, the slide 138 moves toward the axis of the shaft C and closes the aperture 137 and opens the aperture 132 so as to connect it to the outer end of the bore 129. Thus the passageway 131, and in consequence the pipe 84ª and the chamber 122, are rapidly emptied and the springs 56 and 53 extend. Thereafter, the slide 48 moves in such manner as to connect the pipe 110 to the exhaust aperture 54 whereupon the pressure drops in the pipes 110, 109, and therefore in the selector S¹, and the fluid motor which was operative is rendered inoperative.

The volume of the chamber 122, or the oil pressure therein, is therefore regulated at every instant by the governor R¹ and the oil pressure in the fluid motors depends on the volume of the chamber 122 when starting. Thus it can be seen that the pressure in the fluid motors corresponding to their operation depends, when starting, on the speed of the shaft C. Increased rotation of the latter results in increased pressure in the fluid motors and decreased rotation of the shaft C corresponds to decreased pressure in the fluid motors. Thus there is no danger of stalling the motor when starting off or when slowing down.

The procedure is the same when changing from neutral to reverse speed.

Although specific embodiments of the invention have been hereinabove described, many modifications and changes may be made therein without departing from the scope of the invention as defined in the appended claims.

Thus in the first embodiment, the number and position of the apertures 90 of the device G may be chosen in accordance with the desired progressiveness of the filling of the chamber 42, the dimensions of the members of the device J¹ co-operating with these apertures 90 being chosen accordingly.

Having now described my invention what I claim as new and desire to secure by Letters Patent is:

1. Control device for a motor vehicle transmission mechanism, comprising a driving shaft, a driven shaft and disposed between these shafts a gear box and hydraulic actuating devices for this gear box, this control device comprising in combination: a source of liquid under pressure; a pipe connected to the outlet of this source; connected in parallel to the pipe, a selector for admitting said liquid successively into said various hydraulic actuating devices and control means comprising a movable member for controlling the pressure of the liquid admitted into the selector by a controlled exhaust of liquid from the pipe under the control of the movable member; a hydraulic control device comprising a variable capacity chamber for controlling the movements of the movable member of the control means in accordance with the pressure prevailing in the chamber whereby a displacement of the movable member in the direction for ceasing said exhaust of liquid corresponds to an increase in said pressure in the chamber; and a hydraulic governor driven by the driving shaft and supplied with said liquid from said source and providing at its outlet an outlet liquid pressure which varies with the speed of the driving shaft and increases therewith, the governor being combined with the hydraulic control device so that the pressure in the variable capacity chamber increases with said outlet liquid pressure.

2. A device as claimed in claim 1, further comprising an aperture of adjustable size for connecting the variable capacity chamber to the pipe connected to the outlet of the source of liquid for purposes of filling this chamber, and an auxiliary exhaust device controlled by said outlet liquid pressure for controlling the pressure rise in the variable capacity chamber.

3. A device as claimed in claim 2, wherein the auxiliary exhaust device comprises in combination: a series of exhaust apertures distributed in spaced relation along the variable capacity chamber for connecting the latter to exhaust, and closing means movable along the apertures for closing all the apertures when said outlet pressure exceeds a predetermined value and all but one of said apertures when said pressure is lower than said value, the position of the closing means being controlled by said outlet liquid pressure whereby the aperture which is uncovered depends on said pressure.

4. A device as claimed in claim 2, wherein the control means comprises a body in which the variable capacity chamber is disposed and the auxiliary exhaust device comprises: a bore provided in the body parallel to the variable capacity chamber; an exhaust aperture also provided in the body, for connecting the bore to exhaust: a series of second exhaust apertures distributed in spaced relation along the variable capacity chamber for connecting the latter to the bore; a longitudinal recess disposed in the latter and communicating with the exhaust aperture and extending along the entire length of that part of the bore in which said series of second exhaust apertures is disposed, said second apertures being disposed on a generatrix of the bore different from that on which the recess is disposed, a slide in said bore, and elastic means disposed between the slide and one of the ends of the bore for moving the slide in the latter; and a pipe for connecting the other end of the bore to the outlet of the governor, whereby the slide is in equilibrium between the opposing actions of the elastic device and said outlet liquid pressure and occupies a position in the bore which depends on said outlet liquid pressure, said slide having an annular recess, for preventing communication between the recess and all said second exhaust apertures when said outlet liquid pressure exceeds a predetermined value and all but one of said second exhaust apertures when said liquid pressure is lower than said value.

5. A device as claimed in claim 1, wherein the variable capacity chamber is directly connected to the outlet of the governor whereby the engagement of the speeds of the gear box is only retarded when starting.

6. A motor transmission unit comprising a motor, a driving shaft driven by the latter, a driven shaft, a gear box, hydraulic actuating devices for the latter and a control device comprising: a source of liquid under pressure; a pipe connected to the outlet of this source; connected in parallel to the pipe, a selector for admitting said liquid successively into said various hydraulic actuating devices and control means comprising a movable member for controlling the pressure of the liquid admitted into the selector by a controlled exhaust of liquid from the pipe under the control of the movable member; a hydraulic control device comprising a variable capacity chamber for controlling the movements of the movable member of the control means in accordance with the pressure prevailing in the chamber whereby a displacement of the movable member in the direction for ceasing said exhaust of liquid corresponds to an increase in said pressure in the chamber; and a hydraulic governor driven by the driving shaft and supplied with said liquid from said source and providing at its outlet an outlet liquid pressure which varies with the speed of the driving shaft and increases therewith, the governor being combined with the hydraulic control device so that the pressure in the variable capacity chamber increases with said outlet liquid pressure.

References Cited in the file of this patent

UNITED STATES PATENTS

| | | |
|---|---|---|
| 2,523,726 | Seeger | Sept. 26, 1950 |
| 2,590,231 | Chilton | Mar. 25, 1952 |
| 2,620,679 | Issigonis et al. | Dec. 9, 1952 |